(12) United States Patent
Mizobe

(10) Patent No.: US 8,794,605 B2
(45) Date of Patent: Aug. 5, 2014

(54) ANTI-VIBRATION CONNECTING ROD

(75) Inventor: Masaaki Mizobe, Kurashiki (JP)

(73) Assignee: Kurashiki Kako Co., Ltd., Kurashiki-Shi (JP)

( * ) Notice: Subject to any disclaimer, the term of this patent is extended or adjusted under 35 U.S.C. 154(b) by 95 days.

(21) Appl. No.: 13/289,565

(22) Filed: Nov. 4, 2011

(65) Prior Publication Data

US 2012/0112395 A1 May 10, 2012

(30) Foreign Application Priority Data

Nov. 5, 2010 (JP) ................................ 2010-248378

(51) Int. Cl.
*F16F 15/08* (2006.01)

(52) U.S. Cl.
USPC ................ 267/140.12; 267/141; 267/141.2; 267/293; 74/579 E; 74/579 F; 74/579 R; 74/587; 280/93.51; 248/610; 180/89.2; 180/296

(58) Field of Classification Search
USPC ............ 267/139, 140.12, 141, 141.2, 140.4, 267/140.5, 219, 220, 292, 293; 74/579 E, 74/579 F, 579 R, 587; 248/635, 638, 647, 248/678, 610; 403/220, 225, 226; 280/93.51; 180/296, 89.2

See application file for complete search history.

(56) References Cited

U.S. PATENT DOCUMENTS

| | | | | |
|---|---|---|---|---|
| 4,817,909 A | * | 4/1989 | Deane | 248/610 |
| 7,350,778 B2 | * | 4/2008 | Endo | 267/141.2 |
| 8,403,309 B2 | * | 3/2013 | Kamei | 267/141 |
| 8,430,382 B2 | * | 4/2013 | Kashihara et al. | 267/140.12 |
| 2005/0254888 A1 | * | 11/2005 | Oji | 403/187 |
| 2007/0272051 A1 | * | 11/2007 | Kamei et al. | 74/579 R |
| 2008/0315473 A1 | * | 12/2008 | Nishimae et al. | 267/140.11 |
| 2009/0174126 A1 | * | 7/2009 | Takeshima et al. | 267/140.4 |

FOREIGN PATENT DOCUMENTS

| | | | |
|---|---|---|---|
| JP | 2004-308739 A | | 11/2004 |
| JP | 2004-316798 A | | 11/2004 |
| JP | 2005163843 A | * | 6/2005 |
| JP | 2006283870 A | * | 10/2006 |
| JP | 2006349068 A | * | 12/2006 |
| JP | 2008249113 A | * | 10/2008 |
| JP | 2009108906 A | * | 5/2009 |
| JP | 2009-243483 A | | 10/2009 |
| JP | 2011-190884 A | | 9/2011 |

* cited by examiner

*Primary Examiner* — Thomas J Williams
*Assistant Examiner* — Mariano Sy
(74) *Attorney, Agent, or Firm* — Knobbe Martens Olson & Bear LLP

(57) ABSTRACT

A first elastic member coupling a first inner cylinder and a first cylindrical part is integrated with the outer surface of the first inner cylinder and the inner surface of the first cylindrical part, thereby ensuring flexibility in molding the first cylindrical part. In addition, a stopper body is formed by making a part of the inner surface of the first cylindrical part facing the first inner cylinder in a main-load application direction project inward along a radius of the first cylindrical part.

3 Claims, 6 Drawing Sheets

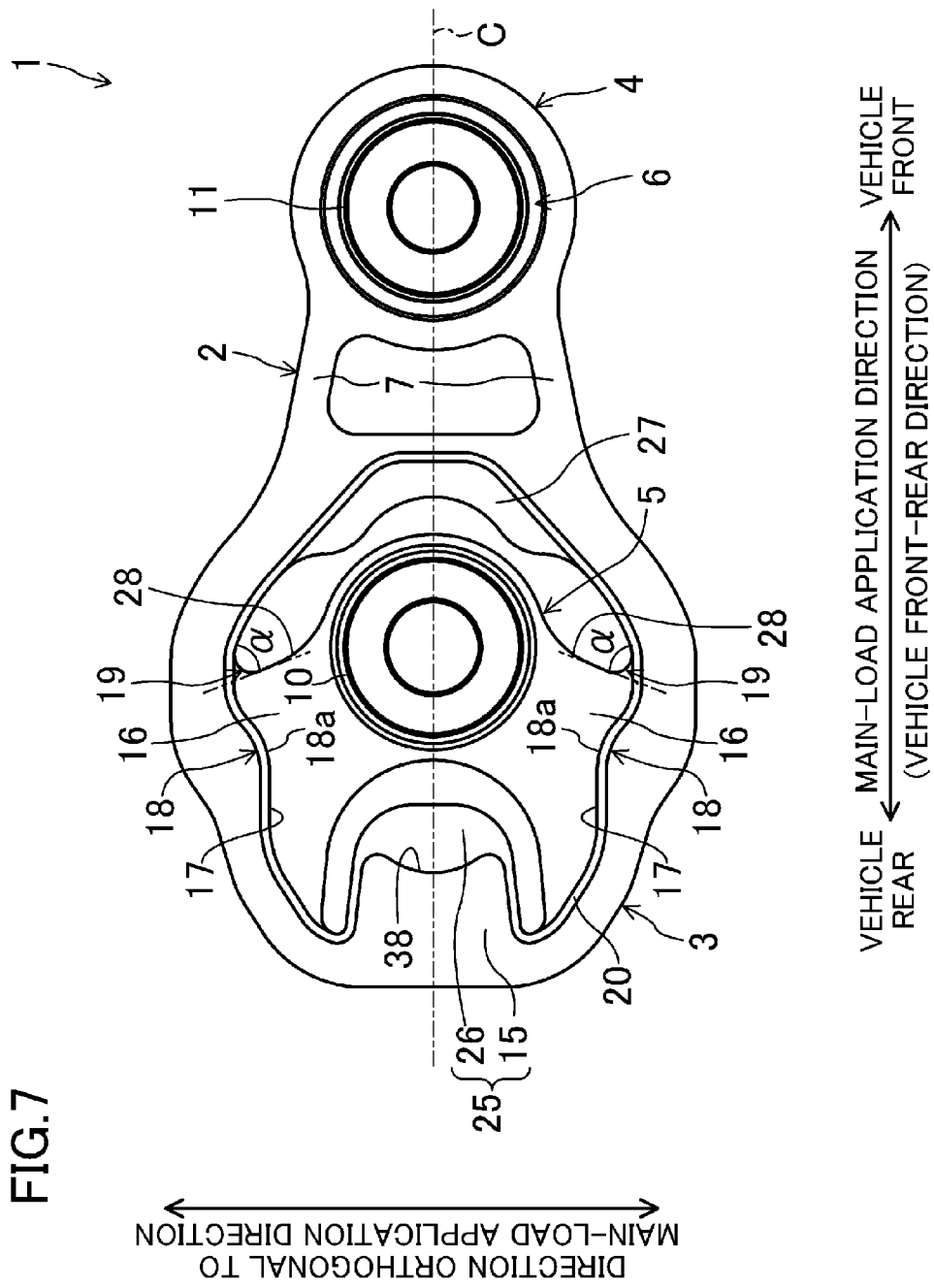

ANTI-VIBRATION CONNECTING ROD

CROSS-REFERENCE TO RELATED APPLICATION

This application claims priority to Japanese Patent Application No. 2010-248378 filed on Nov. 5, 2010, the disclosure of which including the specification, the drawings, and the claims is hereby incorporated by reference in its entirety.

BACKGROUND

The present disclosure relates to an anti-vibration connecting rod for connecting two members to be connected while reducing vibration.

A known anti-vibration connecting rod includes: a rod body having two cylindrical parts disposed side by side in the direction of applying a main load (hereinafter referred to as a "main-load application direction"); inner cylinders respectively provided in the cylindrical parts, attached to members to be connected (hereinafter referred to as "connected members"), and supported, while being coupled, by the inner surfaces of the respective cylindrical parts through rubber elastic bodies; and a stopper for restricting the amount of relative movement of the inner cylinders in the direction of applying a main load.

For example, Japanese Patent Publication No. 2009-243483 shows the following structure. In this structure, a stopper is made of a rubber stopper projecting from the outer surface of an inner cylinder toward one end in the main-load application direction. In the outer surface of the inner cylinder, rubber bodies extending in opposite directions orthogonal to the main-load application direction are provided as well as the rubber stopper. Together with these rubber bodies, the rubber stopper is formed to be integrated with the outer surface of the inner cylinder by molding with vulcanization. A vulcanized rubber product made of the rubber stopper and the robber bodies is fixed on the inner surface of the cylindrical part by press fitting.

SUMMARY

In the anti-vibration connecting rod shown in Japanese Patent Publication No. 2009-243483, however, the stopper is a rubber member. Thus, when the inner cylinder is relatively displaced in the main-load application direction to come into contact with the stopper, the stopper is completely elastically deformed in a radial direction (i.e., the main-load application direction) in the cylindrical part, and then also deformed in a cylinder axis direction. Accordingly, a stroke end of the inner cylinder controlled by the stopper varies, and thus, the rubber body is deformed more than expected, resulting in that spring properties and durability performance thereof degrade.

In addition, since the rubber stopper is integrated with the rubber body in the anti-vibration connecting rod, the rubber stopper and the rubber body affect each other with respect to their spring properties, resulting in the problem of difficulty in obtaining desired spring properties.

It is therefore an object of the present disclosure to provide an anti-vibration connecting rod capable of obtaining desired spring properties, while reducing variation in the stroke end of an inner cylinder controlled by a stopper.

To achieve the object, an elastic member coupling an inner cylinder and a cylindrical part is integrated with the outer surface of the inner cylinder and the inner surface of the cylindrical part, thereby ensuring flexibility in molding the cylindrical part. In addition, a stopper body is formed by making a part of the inner surface of the cylindrical part facing the inner cylinder in the main-load application direction project inward along a radius of the cylindrical part.

Specifically, in an aspect of the present disclosure, an anti-vibration connecting rod includes: a rod body including first and second cylindrical parts disposed to be spaced apart from each other in a main-load application direction; a first inner cylinder located in the first cylindrical part, and coupled to an inner surface of the first cylindrical part through a first elastic member, a connected member being attached to the first inner cylinder; a second inner cylinder located in the second cylindrical part, and coupled to an inner surface of the second cylindrical part through a second elastic member, another connected member being attached to the second inner cylinder; and a stopper located in the first cylindrical part, and configured to restrict an amount of relative displacement of the first inner cylinder relative to the rod body in the main-load application direction. In this anti-vibration connecting rod, the first elastic member is integrated with the inner surface of the first cylindrical part and an outer surface of the first inner cylinder, and the stopper includes a stopper body which is a part of the inner surface of the first cylindrical part facing the first inner cylinder in the main-load application direction and projecting inward in a radial direction of the first cylindrical part.

In this structure, the first elastic member in the first cylindrical part is integrated with the inner surface of the first cylindrical part and the outer surface of the first inner cylinder, thereby enhancing flexibility in molding (shaping) the first cylindrical part. In addition to the enhancement of flexibility in molding the first cylindrical part, a stopper body is formed by making a part of the inner surface of the first cylindrical part facing the first inner cylinder in the main-load application direction project inward along a radius of the first cylindrical part. This high-rigidity stopper body can restrict relative displacement of the inner cylinder, thereby ensuring prevention of a variation in the stroke end of the inner cylinder. In addition, since the stopper body is formed as a part of the first cylindrical part, the number of components can be reduced, thereby reducing a fabrication cost.

The stopper preferably further includes a stopper elastic part made of an elastic body provided in a distal surface of the stopper body.

This structure enables spring properties of the anti-vibration connecting rod in the main-load application direction after stopper operation (i.e., after inner cylinder is relatively displaced in the main-load application direction to come into contact with the stopper elastic part) to be easily optimized only by changing the shape or materials of the stopper elastic part. Specifically, in a case where the stopper elastic part is provided in the first inner cylinder, the first elastic member and the stopper elastic part connected to the first cylindrical part affect each other after operation of the stopper, thus making it difficult to obtain desired spring properties. On the other hand, in the structure described above, since the stopper elastic part is provided in the first cylindrical part, which is a component separated from the first inner cylinder, the first elastic member and the stopper body function as spring elements independent of each other after stopper operation, thereby easily obtaining desired spring properties.

In a direction perpendicular to the main-load application direction, a cross section of the stopper elastic part forming the stopper preferably expands stepwise or continuously from a distal end of the stopper toward a proximal end of the stopper.

In this structure, since a cross section of the stopper elastic part perpendicular to the main-load application direction expands stepwise or continuously from a distal end toward a proximal end of the stopper, it is possible to reduce an abrupt increase in spring constant in the main-load application direction of the anti-vibration connecting rod in stopper operation. Accordingly, in a case where the anti-vibration connecting rod is used as a torque rod connecting an engine of a vehicle and a vehicle body, for example, NVH of the vehicle can be reduced.

Preferably, a recess which is open to a first inner cylinder side is provided in a part of the distal surface of the stopper body located on a line passing through a cylinder axis of the first inner cylinder and extending in the main-load application direction when viewed along the cylinder axis of the first inner cylinder, and the stopper elastic part is provided in the distal surface of the stopper body to fill the recess.

This structure ensures a sufficient thickness (i.e., the thickness in the main-load application direction) of a part of the stopper elastic part which is most easily deformed when being in contact with the first inner cylinder. Accordingly, the amount of local distortion of this part when the first inner cylinder comes into contact with the stopper elastic part can be reduced, as compared to a case where the recess is not provided. As a result, durability of the stopper elastic part can be enhanced.

Preferably, a recess having a cylindrical surface is provided in the distal surface of the stopper body, in the recess, a center of curvature is located on a line passing through the cylinder axis of the first inner cylinder and extending in the main-load application direction when viewed along the cylinder axis of the first inner cylinder, and a radius of curvature is equal to a radius of the first inner cylinder, and the stopper elastic part is provided in the distal surface of the stopper body to fill the recess.

With this structure, the stopper elastic part is compressed to be deformed between the first inner cylinder and the stopper body in stopper operation, and then, comes into surface contact with the outer surface of the first inner cylinder. In a case where the recess is not provided, the stopper elastic part comes into line contact with the outer surface of the first inner cylinder in stopper operation. Unlike this case, since the stopper elastic part comes into surface contact with the outer surface of the first inner cylinder in the structure described above, the contact pressure on the stopper elastic part from the first inner cylinder can be reduced, thereby enhancing durability of the stopper elastic part.

BRIEF DESCRIPTION OF THE DRAWINGS

FIG. 7 is a view illustrating a third embodiment and corresponding to FIG. 2.

DETAILED DESCRIPTION

First Embodiment

A first embodiment will be described in detail hereinafter with reference to the drawings.

Figure 1:
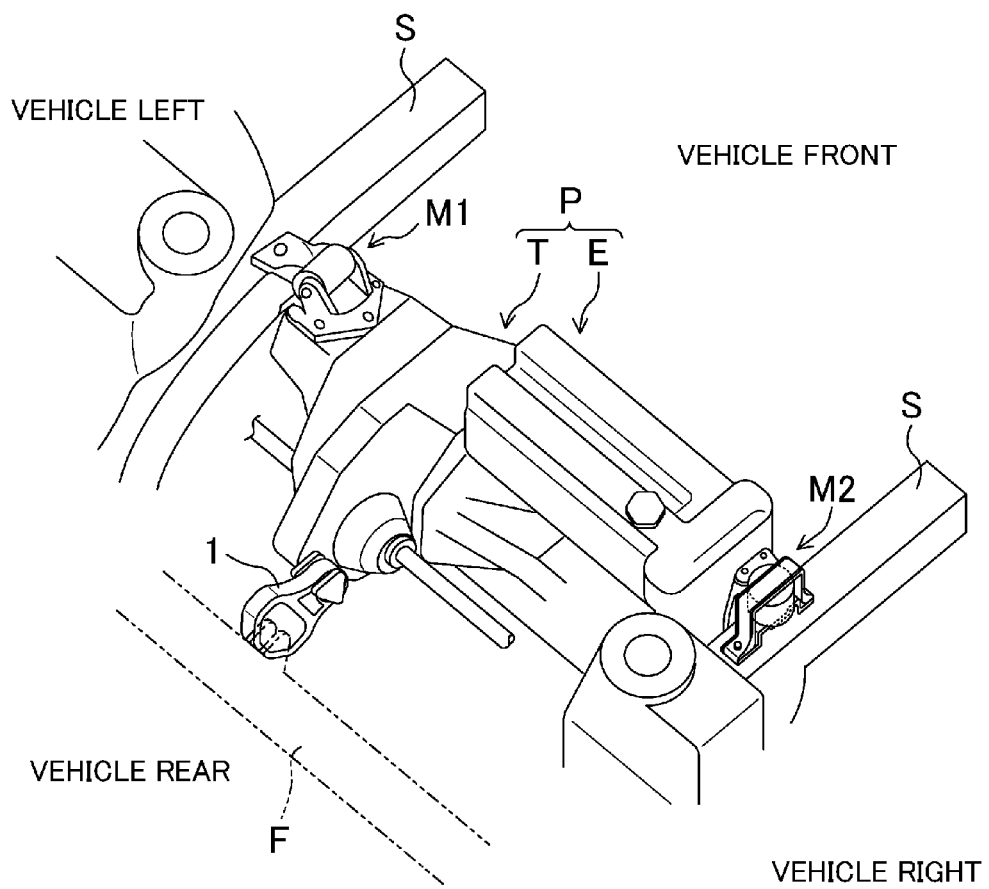
FIG. 1 is a perspective view illustrating an engine mount system of a vehicle including a torque rod as an example anti-vibration connecting rod according to a first embodiment, when viewed obliquely downward from above the rear of the vehicle.

FIG. 1 illustrates an engine mount system of a vehicle including an example torque rod (an anti-vibration connecting rod) 1 according to a first embodiment. In FIG. 1, reference character P denotes a power plant to which an engine E and a transmission T are connected in series.

The power plant P is placed to be transverse (sideways) with respect to an engine compartment in such a manner that the longitudinal direction of the power plant P matches the vehicle width direction. Anti-vibration mounts M1 and M2 are respectively provided at both ends of the power plant P in the longitudinal direction thereof. The power plant P is elastically supported by the anti-vibration mounts M1 and M2 on a side frame S of the vehicle. These anti-vibration mounts M1 and M2 are located above a principal axis of inertia (i.e., a roll axis) of the power plant P. This structure allows the power plant P to swing, like a pendulum, around a spindle for swing connecting two support points of loads of the anti-vibration mounts M1 and M2.

In this engine mount system, when a large drive counterforce acts, e.g., when a vehicle is rapidly accelerated or decelerated, for example, the power plant P is forced to widely swing back and forth, i.e., in the front-rear directions of the vehicle body, in the same manner as a pendulum. Such a swing in the front-rear directions of the vehicle body is restricted by a structure in which the bottom of the power plant P and a vehicle subframe F located at the rear of the power plant P in the vehicle body are connected by a torque rod 1. In this manner, the torque rod 1 of the first embodiment mainly receives a load in the vehicle front-rear directions.

Figure 2:
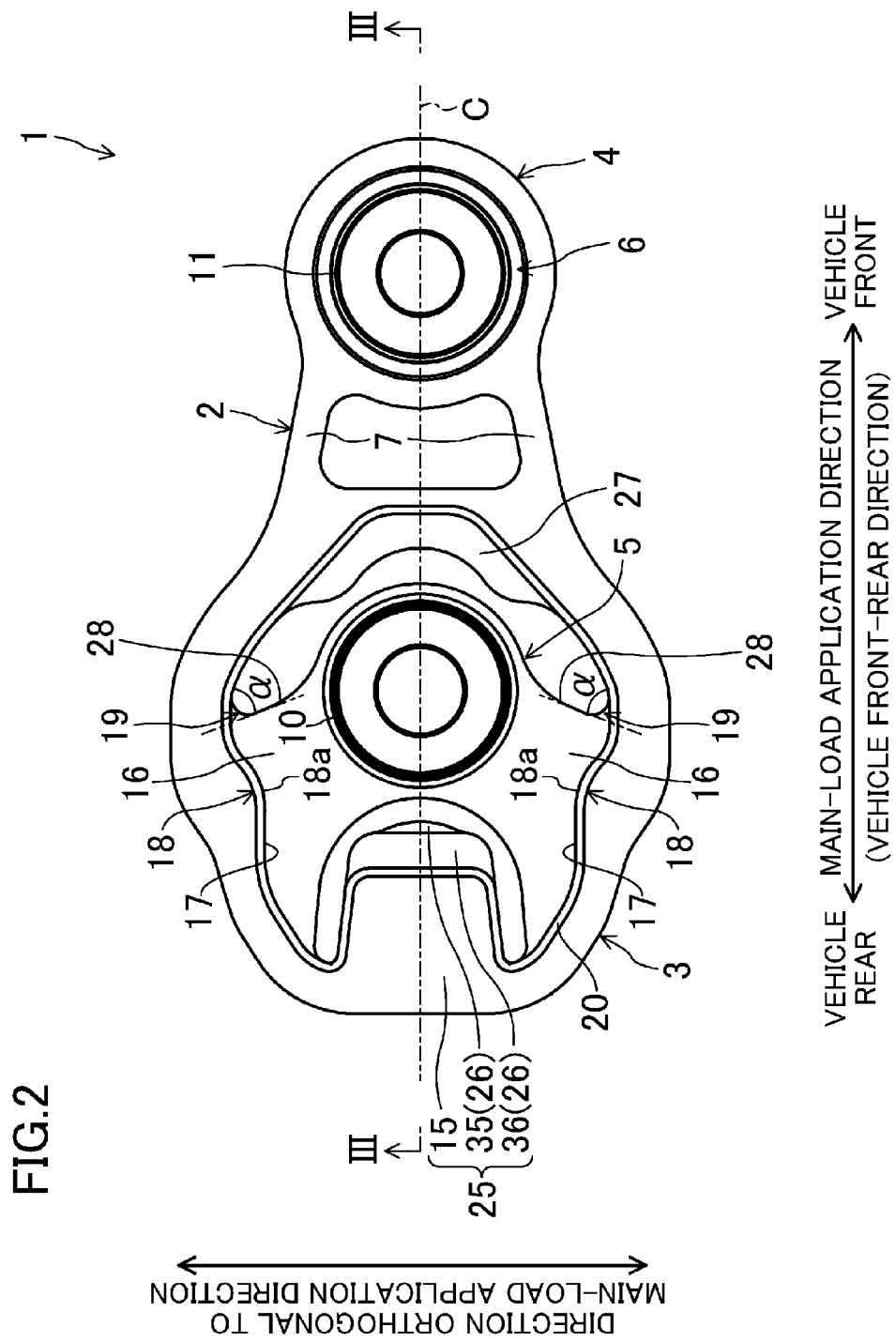
FIG. 2 is a side view illustrating an example torque rod according to the first embodiment, when viewed in a cylinder axis direction of a first inner cylinder.

As illustrated in FIG. 2, the torque rod 1 includes: a rod body 2 including first and second cylindrical parts 3 and 4 disposed to be spaced apart from each other in the main-load application direction (i.e., the front-rear direction of the vehicle); a first inner cylinder 10 provided in the first cylindrical part 3 and coupled to the inner surface of the first cylindrical part 3 through a first elastic member 5; a second inner cylinder 11 provided in the second cylindrical part 4, attached to the power plant P (i.e., another connected member), coupled to the inner surface of the second cylindrical part 4 through a second elastic member 6.

The rod body 2 is made of a metal frame member whose overall shape is a gourd shape. The longitudinal direction of the rod body 2 matches the main-load application direction (i.e., the vehicle front-rear direction). The first cylindrical part 3 and the second cylindrical part 4 are respectively formed at both ends of the rod body 2 in the longitudinal direction, and coupled together through a pair of coupling frames 7.

The first cylindrical part 3 and the second cylindrical part 4 are provided in such a manner that the cylinder holes thereof are open to the same direction. The second cylindrical part 4 is cylindrical, i.e., has the shape of a substantially complete circuit when viewed along the cylinder axis, whereas the first cylindrical part 3 is cylindrical having a substantially polygonal outer shape when viewed along the cylinder axis. The first cylindrical part 3 has a cylinder hole larger than that of the second cylindrical part 4. A first stopper body 15 (which will be described later) projecting toward the front of the vehicle is formed in the rear end of the inner surface of the first cylindrical part 3. A projecting part 18 projecting radially inward is formed in a connection surface 17 connected to an elastic arm 16, which will be described later, in the inner surface of the first cylindrical part 3. The stopper body 15 and the projecting part 18 together form a part of the rod body 2, and made of metal members.

The projecting part 18 has a curved projecting surface 18a radially facing the inside of the first cylindrical part 3. The projecting surface 18a is smoothly (continuously) connected to a part of the inner surface of the first cylindrical part 3 except for the projecting surface 18a. The projecting part 18 is formed on an intermediate part of the connection surface 17 except for both ends thereof in the main-load application direction. More specifically, the projecting part 18 is formed on a portion of the intermediate part toward a corner radius (R) part 19 (which will be described later). The amount of projection of the projecting part 18 is approximately the same as the radius of the corner R part 19, for example.

The first inner cylinder 10 and the second inner cylinder 11 are made of cylindrical metal members. These inner cylinders 10 and 11 are parallel to each other. The rod body 2 is symmetric, when viewed in a cross section of the rod (i.e., along the cylinder axis of the first cylindrical part 3), with respect to a line C passing through a shaft center of the first inner cylinder 10 and a shaft center of the second inner cylinder 11.

The first inner cylinder 10 is located at a position slightly shifted toward the second inner cylinder 11 (i.e., toward the rear of the vehicle) from the center of the first cylindrical part 3 in the main-load application direction. As described above, the first inner cylinder 10 is elastically coupled to the inner surface of the first cylindrical part 3 through the first elastic member 5. The first inner cylinder 10 is coupled to the subframe F with a bolt, not shown, inserted in its cylinder hole, thereby coupling the end of the torque rod 1 toward the first cylindrical part 3 to the subframe F.

The first elastic member 5 is made of a rubber elastic body. The first elastic member 5 includes: a pair of elastic arms 16 extending radially outward from the first inner cylinder 10; and a thin enclosing part 20 covering the entire inner surface of the thin first cylindrical part 3. In the enclosing part 20, a first-stopper rubber part 26 forming a part of a first stopper 25 and a rubber second stopper 27 located at the side opposite to the first stopper 25 with respect to the first inner cylinder 10 are integrally formed. As described later, the first stopper 25 restricts the amount of relative displacement of the first inner cylinder 10 toward the front of the vehicle relative to the rod body 2 when the vehicle is accelerated, for example. The first stopper 25 includes the first stopper body 15 made of a metal and forming a part of the rod body 2 and the first-stopper rubber part 26 covering the distal surface of the first stopper body 15. The second stopper 27 restricts the amount of relative displacement of the first inner cylinder 10 toward the rear of the vehicle relative to the rod body 2 when the vehicle is decelerated, for example. The second stopper 27 is made of only a rubber elastic body.

The pair of elastic arms 16 is symmetric, when viewed in a cross section of the rod, with respect to the line C, and forms a substantially V shape. More specifically, each of the elastic arms 16 extends radially outward from the outer surface of the first inner cylinder 10, tilts toward one end (i.e., toward the rear of the vehicle) in the main-load application direction (i.e., the vehicle front-rear direction) with respect to the direction orthogonal to the main-load application direction, and is connected to the inner surface of the first cylindrical part 3. In this manner, each of the elastic arms 16 extends to tilt with respect to the direction orthogonal to the main-load application direction, thereby increasing the spring constant of the elastic arm 16. In addition, it is possible to increase the length of the elastic arm 16 in the extension direction to enhance durability thereof. The pair of elastic arms 16 functions as a main spring part which absorbs vibration applied to the torque rod 1.

At a connection part between a side end surface 28 of each of the elastic arms 16 located toward the front of the vehicle and an inner surface of the first cylindrical part 3 (more specifically, the inner surface of the enclosing part 20), the corner R part 19 smoothly joining these surfaces is formed.

The first elastic member 5 is integrated with the first inner cylinder 10 and the first cylindrical part 3 through vulcanization molding. Specifically, after the rod body 2 has been placed in an injection mold, the first inner cylinder 10 is set in the first cylindrical part 3 of the rod body 2, and then after mold clamping, an unvulcanized rubber elastic body is injected between the first inner cylinder 10 and the first cylindrical part 3, and is vulcanized by heat, thereby integrating the first inner cylinder 10, the first elastic member 5, and the first cylindrical part 3 together through vulcanization bonding. In this manner, the integration molding with vulcanization can enhance flexibility in the shape of the first cylindrical part 3, as compared to a bush-type vulcanized product. Accordingly, the shape of the first cylindrical part 3 can be not only a cylindrical shape but also a relatively complex shape having the first stopper body 15 and the projecting part 18, as in the first embodiment. In addition, an external cylinder, which is needed in the case of a bush pressure process, can be omitted, thereby reducing a fabrication cost.

The second inner cylinder 11 is provided in the second cylindrical part 4 on the same axis as the second cylindrical part 4, and as described above, is coupled to the inner surface of the second cylindrical part 4 through the second elastic member 6. The second elastic member 6 is formed over, and encloses, the entire outer surface of the second inner cylinder 11. In the same manner as the first elastic member 5, the second elastic member 6 in the second cylindrical part 4 is integrated with the second inner cylinder 11 and the second cylindrical part 4 through vulcanization joint. The second cylindrical part 4 is not necessarily integrated and molded by vulcanizing the rubber elastic body, and may be formed by press fitting a bush-type vulcanized product.

The second inner cylinder 11 is coupled to the bottom of the power plant P with a bolt, not shown, inserted in its cylinder hole, thereby coupling the end of the torque rod 1 toward the second cylindrical part to the power plant P. In this manner, the first inner cylinder 10 is coupled to the subframe F and the second inner cylinder 11 is coupled to the power plant P, thereby coupling the subframe F and the power plant P together through the torque rod 1.

The first stopper 25 formed on the inner surface of the first cylindrical part 3 restricts the amount of relative displacement of the first inner cylinder 10 toward the front of the vehicle relative to the rod body 2 when the vehicle is accelerated, for example. The first stopper 25 includes the first stopper body 15 made of a metal and forming a part of the rod body 2 and the first-stopper rubber part 26 covering the distal surface of the first stopper body 15. The second stopper 27 restricts the amount of relative displacement of the first inner cylinder 10 toward the rear of the vehicle relative to the rod body 2 when the vehicle is decelerated, for example. The second stopper 27 is made of only a rubber elastic body.

The first stopper body 15 is formed substantially in the shape of a trapezoid whose width gradually increases toward the rear of the vehicle, when viewed in a cross section of the rod. The distal surface of the first stopper body 15 is a flat plane perpendicular to the front-rear direction of the vehicle.

The first-stopper rubber part 26 includes a distal step 35 whose cross section perpendicular to the main-load application direction (i.e., the vehicle front-rear direction) is relatively small and a proximal step 36 whose cross section is relatively large, so as to show two-stage spring properties when being in contact with the first inner cylinder 10. The proximal step 36 is substantially in the shape of a trapezoid whose width gradually increases toward the rear of the vehicle when viewed in a cross section of the rod. The distal step 35 is formed in the shape of a spherical surface projecting from the distal surface of the proximal step 36 toward the front of the vehicle. The cross section of the thus-configured first-stopper rubber part 26 perpendicular to the vehicle front-rear direction expands from the front side toward the rear of the vehicle in the distal step 35 according to the curvature of the distal step 35, intermittently expands in the boundary between the distal step 35 and the proximal step 36, and then, in the proximal step 36, gently expands from the front side toward the rear of the vehicle according to the widening degree.

Then, operation of the torque rod 1 will be described. For example, when the vehicle is decelerated, the torque rod 1 receives a load toward the rear of the vehicle through the second inner cylinder 11, and the rod body 2 is displaced toward the rear of the vehicle together with the second inner cylinder 11. Since the first inner cylinder 10 is fixed to the subframe F, the first inner cylinder 10 hardly moves, resulting in that the first inner cylinder 10 is relatively displaced toward the front of the vehicle relative to the rod body 2. The amount of this relative displacement is restricted by the second stopper 27.

On the other hand, when the vehicle is accelerated, the power plant P swings toward the front of the vehicle by an inertial force. Accordingly, the torque rod 1 receives a load toward the front of the vehicle through the second inner cylinder 11, resulting in that the rod body 2 is displaced toward the front of the vehicle together with the second inner cylinder 11. Since the first inner cylinder 10 is fixed to the subframe F, the first inner cylinder 10 hardly moves, resulting in that the first inner cylinder 10 is relatively displaced toward the rear of the vehicle relative to the rod body 2. When the amount of this relative displacement is less than a predetermined first set amount d1, a gap is formed between the first inner cylinder 10 and the first-stopper rubber part 26, and the first inner cylinder 10 is displaced toward the rear of the vehicle, while being supported to the rod body 2 by the pair of elastic arms 16. On the other hand, when the relative displacement amount of the first inner cylinder 10 is the first set amount d1 or more, the first inner cylinder 10 comes into contact with the first-stopper rubber part 26, and the first-stopper rubber part 26 is compressed to be deformed between the first inner cylinder 10 and the first stopper body 15. When the first-stopper rubber part 26 is compressed to the maximum, the relative displaced of the first inner cylinder 10 toward the front of the vehicle is completely stopped by the first-stopper rubber part 26 and the metal first stopper body 15. In this manner, the first stopper 25 prevents the first inner cylinder 10 from being excessively displaced toward the rear of the vehicle (i.e., displaced to a second set amount d2 or more).

In a possible structure, the entire first stopper 25 is made of a rubber elastic body in order to prevent excessive deformation of the first inner cylinder 10. This structure, however, has a problem in which the first stopper 25 is completely deformed in the vehicle front-rear directions, and then is further deformed in the cylinder axis direction to cause a variation in position of the stroke end of the first inner cylinder 10.

On the other hand, in the first embodiment, the first elastic member 5 is integrally formed with the rod body 2 so as to enhance flexibility in molding the rod body 2. In addition, the metal first stopper body 15 is formed by making the end surface of the inner surface of the rod body 2 toward the rear of the vehicle project toward the first inner cylinder 10, and the first stopper rubber part 26 is provided in the distal surface of this first stopper body 15. In this manner, the thickness, in the main-load application direction, of a part (i.e., the first-stopper rubber part 26) of the first stopper 25 made of the rubber elastic body is reduced to the minimum, thereby reducing deformation thereof in the cylinder axis direction. This structure ensures prevention of a variation in the position of the stroke end of the first inner cylinder 10 due to deformation of the first-stopper rubber part 26 in the cylinder axis direction.

In addition, in the first embodiment, the first stopper body 15 is integrated with the inner surface of the rod body 2 as a part of the rod body 2. This structure can reduce the number of components to reduce a fabrication cost.

Furthermore, in the first embodiment, the first-stopper rubber part 26 has two-stage spring properties. This structure can reduce NVH of the vehicle.

Figure 4:
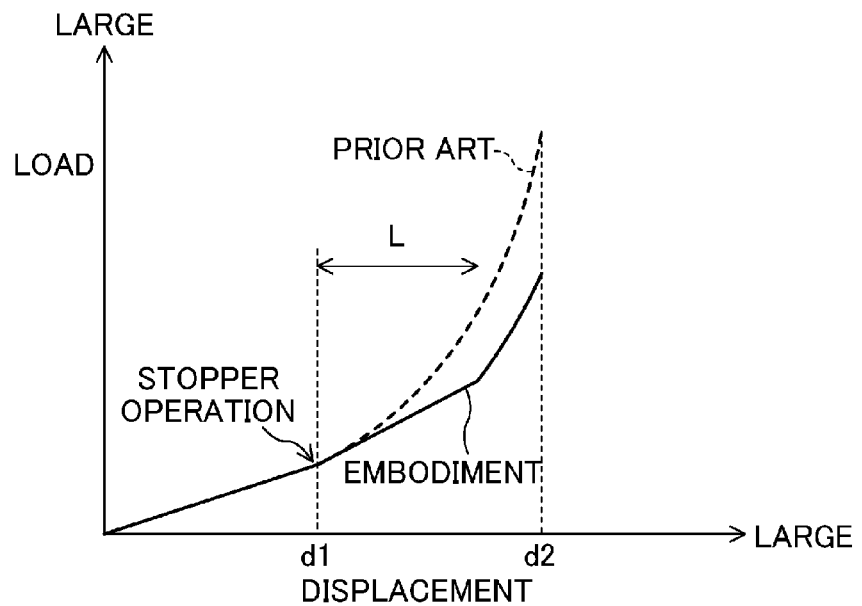
FIG. 4 is a graph showing an outline of a displacement-load characteristic curve of the torque rod.

Specifically, as indicated by the chain double-dashed line in FIG. 4, displacement-load characteristics of a conventional torque rod 1 shows linear characteristics in which an applied load (i.e., a load applied to the rod body 2) linearly increases in proportion to the displacement amount of the first inner cylinder 10 according to spring properties of the elastic arms 16 in a region in which the amount of relative displacement of the first inner cylinder 10 is less than the first set amount d1, while showing nonlinear characteristics in which rigidity of the compressed first stopper rubber part 26 rapidly increases (i.e., the spring constant rapidly increases) and the slope in the graph abruptly rises in a region where the amount of relative displacement of the first inner cylinder 10 is the first set amount d1 or more.

On the other hand, in the torque rod 1 of this embodiment, the first-stopper rubber part 26 has the distal step 35 and the proximal step 36, and the distal step 35 is formed in the shape of a spherical surface projecting toward the front of the vehicle. Accordingly, a cross section of the distal step 35 perpendicular to the main-load application direction gradually expands toward the rear of the vehicle, thereby reducing a rapid increase in the spring constant in an initial stage of stopper operation (a range L in FIG. 4). This reduction leads to reduction of NVH of the vehicle in the initial stage of stopper operation.

Second Embodiment

Figure 3:
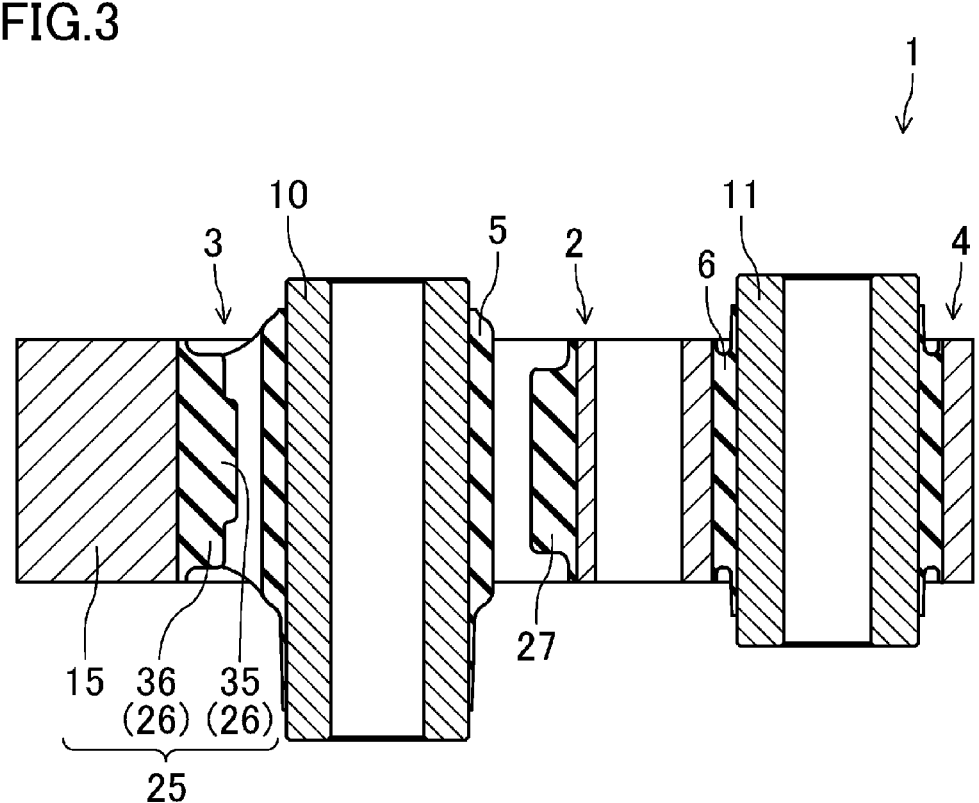
FIG. 3 is a cross-sectional view taken along lien III-III in FIG. 2.
Figure 5:
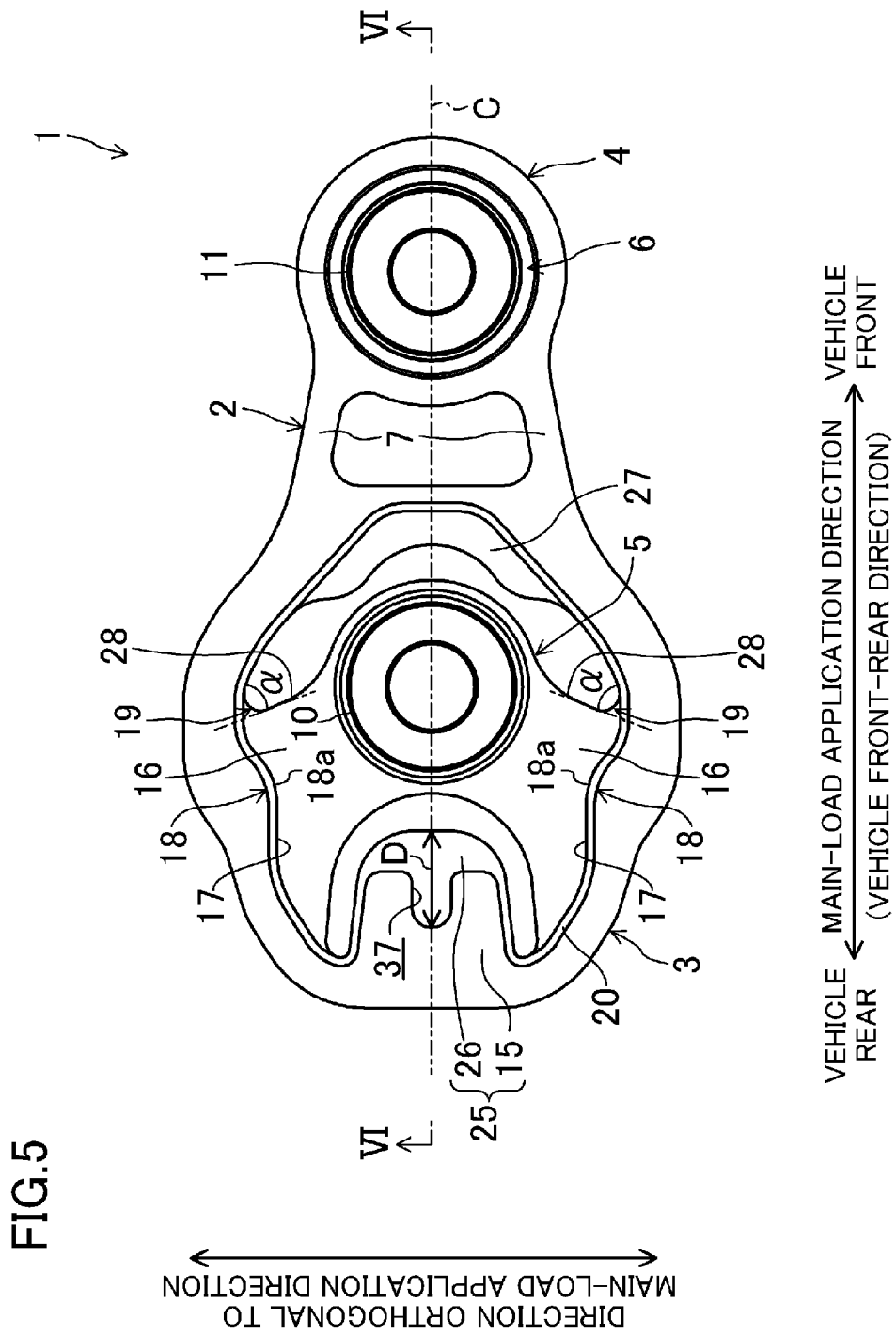
FIG. 5 is a view illustrating a second embodiment and corresponding to FIG. 2.
Figure 6:
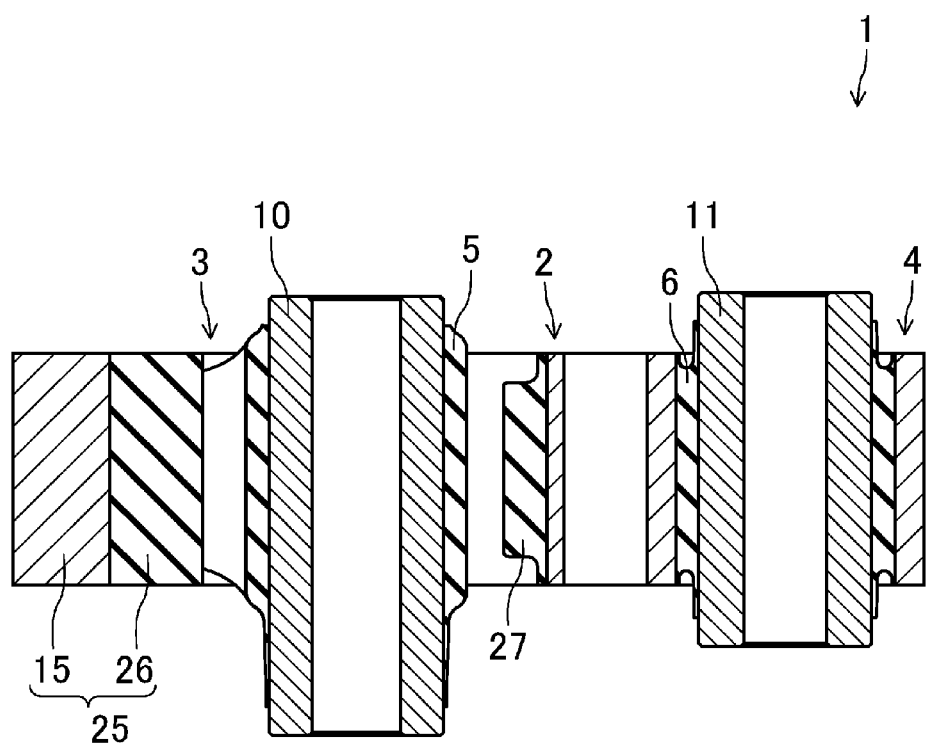
FIG. 6 is a cross-sectional view taken along line VI-VI in FIG. 5.

FIGS. 5 and 6 illustrate a second embodiment. In the second embodiment, the structure of the first stopper 25 differs from that of the first embodiment. In the following embodiments, elements substantially the same as those in FIGS. 2 and 3 are denoted by the same reference characters, and explanation thereof is not repeated.

Specifically, in the second embodiment, a U-shaped recess 37 which has a substantially U shape and is open to the side of a first inner cylinder 10 is formed in a part (i.e., a middle part, in the width direction, of the distal surface of the first stopper body 15) of the distal surface of a first stopper body 15 located on a line C passing through the cylinder axis of the first inner cylinder 10 and extending in the main-load application direction (i.e., the vehicle front-rear direction) when viewed along the cylinder axis of the first inner cylinder 10. A first-stopper rubber part 26 covers the entire distal surface of the first stopper body 15, filling the U-shaped recess 37. The distal surface of the first-stopper rubber part 26 is a flat plane perpendicular to the front-rear direction of the vehicle.

As described above, in this embodiment, the U-shaped recess 37 is formed in a middle part, in the width direction, of the distal surface of the first stopper body 15, thereby ensuring a sufficient thickness D, in the main-load application direction, of a part of the first-stopper rubber part 26 which is most easily deformed when being in contact with the first inner cylinder 10. Accordingly, it is possible to reduce the amount of local distortion of this part when the first inner cylinder 10 comes into contact with the first-stopper rubber part 26. As a result, durability of the first-stopper rubber part 26 can be enhanced.

Third Embodiment

FIG. 7 illustrates a third embodiment of the present disclosure. In the third embodiment, the structure of the first stopper 25 differs from those of the first and second embodiments.

Specifically, in the third embodiment, a cylindrical recess 38 which is recessed toward the proximal end (i.e., toward the rear of the vehicle) is formed in the distal surface of the first stopper body 15. The center of curvature of the cylindrical recess 38 is located on the line C, and the radius of curvature is approximately equal to the radius of the first inner cylinder 10. The first-stopper rubber part 26 covers the entire distal surface of the first stopper body 15 to fill the whole cylindrical recess 38. The distal surface of the first-stopper rubber part 26 is a flat plane perpendicular to the vehicle front-rear direction.

In the anti-vibration connecting rod configured as described above, durability of the first-stopper rubber part can be further enhanced. Specifically, if the distal surface of the first stopper body 15 is formed in a flat plane, the first inner cylinder 10 comes nearly in line contact with the first-stopper rubber part 26. On the other hand, in third embodiment, when the first inner cylinder 10 comes into contact with the first-stopper rubber part 26, the first-stopper rubber part 26 is compressed to be deformed between the outer surface of the first inner cylinder 10 and the inner surface of the cylindrical recess 38, resulting in that the first inner cylinder 10 comes nearly in surface contact with the first-stopper rubber part 26. Accordingly, a contact pressure applied to the first stopper rubber part 26 from the first inner cylinder 10 can be reduced more than that in a case where the cylindrical recess 38 is not provided. As a result, durability of the first-stopper rubber part 26 can be quickly enhanced.

Other Embodiments

In the first embodiment, the first-stopper rubber part 26 has two stages, i.e., the distal step 35 and the proximal step 36. However, the present disclosure is not limited to this structure, and the first stopper rubber part 26 may have three or more stages.

In the first embodiment, the distal step 35 is in the shape of a spherical surface. Alternatively, the distal step 35 may be in the shape of a cylindrical surface, for example, or a trapezoidal prism whose width gradually increases toward the rear of the vehicle, when viewed in a cross section of the rod.

In the foregoing embodiments, the rod body 2 and the inner cylinders 10 and 11 are made of metal members. However, the present disclosure is not limited to this structure, and the rod body 2 and the inner cylinders 10 and 11 may be made of resin members, for example.

In addition, in the foregoing embodiments, the first cylindrical part 3 and the second cylindrical part 4 are open to the same direction. However, the present disclosure is not limited to this structure. Alternatively, as shown in Japanese Patent Publication No. 2007-057070, the cylindrical parts 3 and 4 may be open in directions which are orthogonal to each other.

Further, in the foregoing embodiments, the second stopper 27 is made of only the rubber elastic body. Alternatively, the same structure as the first stopper 25 (i.e., the structure including a metal stopper body and a stopper rubber part) may be applied to the second stopper 27, for example.

Furthermore, the foregoing embodiments may be combined as necessary.

What is claimed is:

1. An anti-vibration connecting rod, comprising:
    a rod body including first and second cylindrical parts disposed to be spaced apart from each other in a main-load application direction;
    a first inner cylinder located in the first cylindrical part, and coupled to an inner surface of the first cylindrical part through a first elastic member, a connected member being attached to the first inner cylinder;
    a second inner cylinder located in the second cylindrical part, and coupled to an inner surface of the second cylindrical part through a second elastic member, another connected member being attached to the second inner cylinder; and
    a stopper located in the first cylindrical part, and configured to restrict an amount of relative displacement of the first inner cylinder relative to the rod body in the main-load application direction, wherein
    the first elastic member is integrated with the inner surface of the first cylindrical part and an outer surface of the first inner cylinder,
    the stopper includes a stopper body which is a part of the inner surface of the first cylindrical part facing the first inner cylinder in the main-load application direction and projecting inward in a radial direction of the first cylindrical part,
    the stopper body has a substantially trapezoid shape whose width gradually increases outward in the radial direction of the first cylindrical part and whose distal surface is a flat plane perpendicular to the main-load application direction,
    the stopper further includes a stopper elastic part made of an elastic body provided in the distal surface of the stopper body,
    a recess which is open to a first inner cylinder side is provided in a part of the distal surface of the stopper body located on a line passing through a cylinder axis of the first inner cylinder and extending in the main-load application direction when viewed along the cylinder axis of the first inner cylinder, and
    the stopper elastic part covers the entire distal surface of the stopper body to fill the recess, and has a distal surface which is a flat plane perpendicular to the main-load application direction.

2. The anti-vibration connecting rod of claim 1, wherein in a direction perpendicular to the main-load application direction, a cross section of the stopper elastic part forming the stopper expands stepwise or continuously from a distal end of the stopper toward a proximal end of the stopper.

3. The anti-vibration connecting rod of claim 1, wherein a recess having a cylindrical surface is provided in the distal surface of the stopper body,
   in the recess, a center of curvature is located on a line passing through the cylinder axis of the first inner cylinder and extending in the main-load application direction when viewed along the cylinder axis of the first inner cylinder, and a radius of curvature is equal to a radius of the first inner cylinder, and
   the stopper elastic part is provided in the distal surface of the stopper body to fill the recess.

* * * * *